(No Model.) 2 Sheets—Sheet 1.

E. A. MURPHY & J. D. WATERS.
MOTH AND INSECT TRAP.

No. 598,950. Patented Feb. 15, 1898.

Witnesses:  
F. G. Fischer  
G. W. Thorpe

Inventors  
E. A. Murphy & J. D. Waters.  
By Higdon & Higdon  
Attys.

(No Model.) 2 Sheets—Sheet 2.
E. A. MURPHY & J. D. WATERS.
MOTH AND INSECT TRAP.
No. 598,950. Patented Feb. 15, 1898.
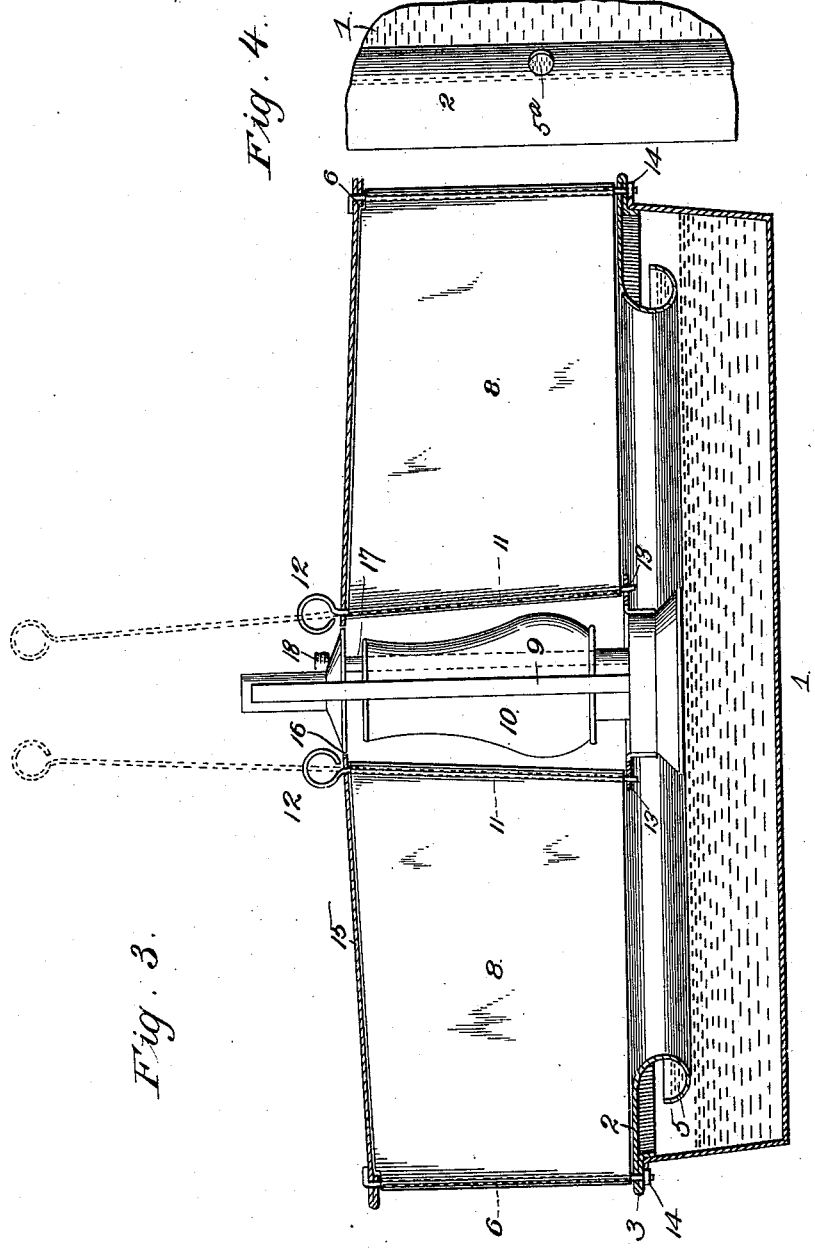

UNITED STATES PATENT OFFICE.

EDWARD A. MURPHY AND JAMES D. WATERS, OF BONNER SPRINGS, KANSAS.

MOTH AND INSECT TRAP.

SPECIFICATION forming part of Letters Patent No. 598,950, dated February 15, 1898.

Application filed May 28, 1897. Serial No. 638,500. (No model.)

*To all whom it may concern:*

Be it known that we, EDWARD A. MURPHY and JAMES D. WATERS, of Bonner Springs, Wyandotte county, Kansas, have invented certain new and useful Improvements in Moth and Insect Traps, of which the following is a full, clear, and exact description, reference being had to the accompanying drawings, forming a part thereof.

Our invention relates to insect-traps; and it consists in certain novel and peculiar features of construction and combinations of parts, as will be hereinafter described and claimed.

The object of the invention is to produce, first, a device of this character whereby moths and insects entering will be invariably entrapped and from which they cannot escape; secondly, which is visible for a great distance when set at a proper elevation; thirdly, which is of knockdown construction, that it may be more easily stored, transported, cleaned, or repaired, and, finally, which is simple, durable, and inexpensive of construction.

In order that the invention may be fully understood, we will proceed to describe it with reference to the accompanying drawings, in which—

Figure 1:
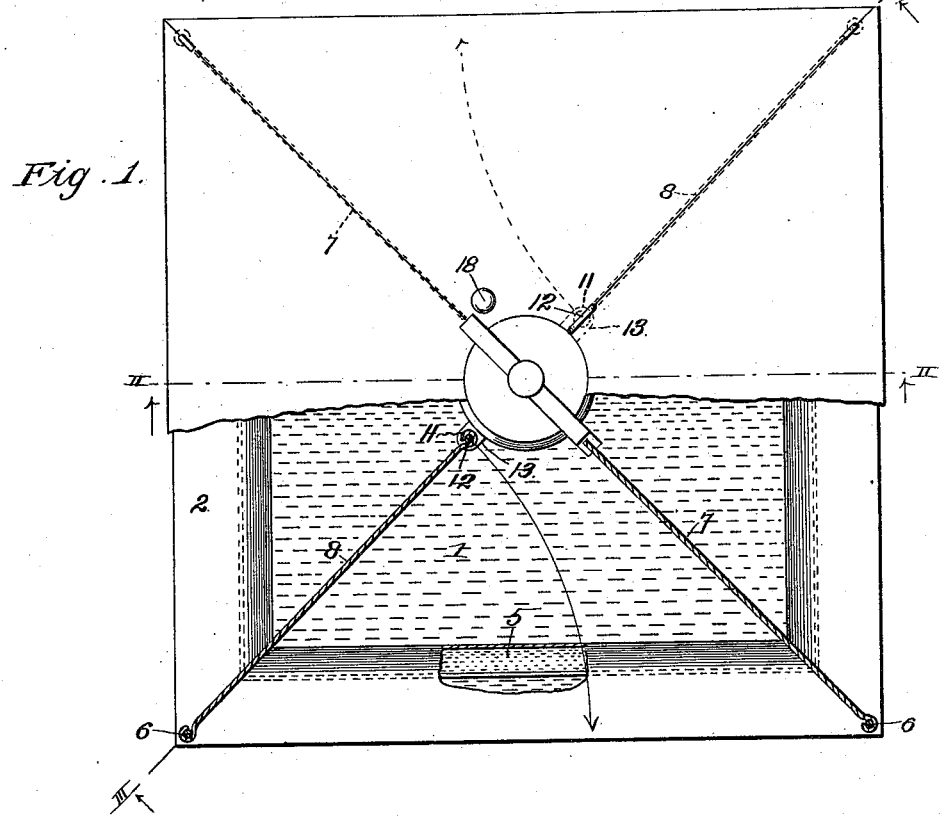
Figure 2:
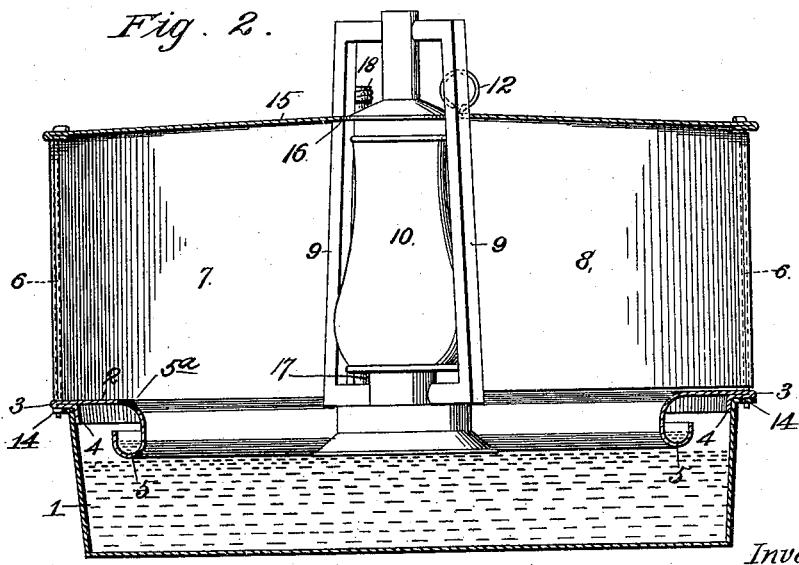

Figure 1 represents a view, partly in top plan and partly in horizontal section, of a moth and insect trap embodying our invention. Fig. 2 represents a cross-section taken on the line II II of Fig. 1. Fig. 3 represents a section taken on the line III III of Fig. 1. Fig. 4 illustrates a part of the trap.

The trap by preference is mainly constructed of sheet metal, such as zinc, with the shields or deflectors, which will be hereinafter described, preferably of tin or other burnished metal, for a purpose which will hereinafter appear.

In the said drawings, 1 designates a shallow tank, preferably of rectangular configuration. 2 designates a similarly-contoured annular frame, which rests upon and depends within the tank. Said frame is preferably bent back at its outer margin, as shown at 3, so as to form a flange to rest upon the upper edge of the tank and a depending flange 4 to fit snugly within the upper edge of the tank and reliably maintain the frame in position. Said frame also at its inner edge is bent downwardly and then upwardly to approximately U shape, in order to form or provide an annular trough 5, which is above the water-line of the tank. This trough is adapted to be supplied with water or any liquid destructive to insects through an aperture $5^a$, formed in the frame vertically above the trough at a suitable point.

6 designates vertical bolts or tie-rods, which are arranged and extend through the frame at its corners.

7 designates a pair of oppositely-arranged diagonal deflectors or shields, which are formed with eyes through which certain of said bolts extend.

8 designates a second pair of deflectors or shields. These extend radially to the other corner of the frame and are coiled around the other bolt 6 in a similar manner.

The deflectors or shields 7 are secured rigidly in any suitable manner to the arms 9 of a lantern 10 of the construction shown or of any other suitable or preferred construction. The inner ends of the deflectors or shields 8 are formed with the vertical eyes or loops 11, which rest upon the angle-plates 13 of the lantern, and extending through said eyes 11 and registering apertures of said angle-plates are removable rods 12, said rods being adapted to be slid upwardly from engagement with such parts in order to render access to the lantern easy and to permit and facilitate the removal of the globe or burner of the lantern when desirable or necessary. When such rods are removed, the deflectors or shields 8 may be swung or operated pivotally upon the bolt 6, as indicated in Fig. 1, and in order to prevent the accidental displacement of said bolts they are engaged by clamping-nuts at their lower ends, the upper ends of said bolts being provided with heads of any preferred type, which bear firmly down upon the cover 15, resting upon and supported by the deflectors or shields 7 and 8. The rods 12 also extend through said cover. The cover is of the same configuration, preferably, as the tank of the frame and is provided with the central hole or opening 16, through which the lantern-frame projects, in order that it may be grasped as a handle to convey the trap, with the exception of the tank, from place to place.

In order to supply the lantern with oil conveniently, the customary screw-cap is dispensed with and a tube 17 employed, which extends through the cover, and the upper end of said tube is closed by a screw-cap 18.

When the trap is prepared for use, the lantern being lighted, of course, it is placed in a conspicuous position in the field or vineyard where moths and insects are troublesome or dangerous to the growing crops or fruit. The insects which are particularly troublesome are what are known as "fruit," "tobacco," and "cotton" bugs.

By the peculiar construction of this trap, with the deflectors 7 and 8 extending divergently with reference to each other, it is obvious that the reflected light may be seen at a great distance, and in fact the glare is so intense by this arrangement that at fifty feet it is almost impossible to see any part of the trap except the rays of light, it being understood, of course, that the cover by overhanging the deflectors for some distance centralizes the light and prevents it from radiating straight upward. This is done that the insects, naturally and always attracted by a light, may not, in seeking it, fly over the trap, but will pass under said cover, and by striking against either of said deflectors, the cover, or the lantern will be precipitated downward into the water of the tank, from which they cannot escape. They cannot escape by crawling up upon the lantern, owing to the fact that the latter is suspended above the water and is not supported by a standard from the bottom, up which they could crawl; nor can they by crawling up the sides of the tank escape, owing to the fact that their path is intercepted by the trough of water, which in practice effectually bars their escape. They cannot escape up through the feed-opening 5$^a$ of the trough, because it is too small for insects of the kind mentioned to pass through. Therefore it is obvious that all the insects and moths which enter the trap from every direction are precipitated down into the water and reliably entrapped.

The deflectors 17 act as shields to prevent the insects passing the light, owing to the fact that they diverge so widely at their outer ends, and they act as deflectors by reason of the fact that their tendency is to force the insects down into the water.

This trap in practice is visible for a distance of about three miles and gathers in insects through a very large radius.

From the above description it will be apparent that we have produced a trap of the character described which embodies the features of advantage enumerated in the statement of invention, and it is to be understood, of course, that various changes in the form, proportion, and detail construction of parts may be made without departing from the spirit and scope or sacrificing any of the advantages of our invention.

Having thus described the invention, what we claim as new, and desire to secure by Letters Patent, is—

1. A moth and insect trap, comprising a suitable tank, an annular frame mounted thereon and provided with an annular trough above the water-line of the tank, divergent deflectors or shields above said frame and tank, a lantern suspended above the water-line of the tank at the inner ends of said deflectors or shields, and a cover upon said deflectors or shields, substantially as described.

2. A moth and insect trap, comprising a suitable tank, an annular frame upon the same and provided with an annular trough depending within but above the water-line of the same, provided with an opening, divergent deflectors resting upon said frame, a lantern supported by and suspended from the inner ends of said deflectors, and a cover secured upon the deflectors or shields, substantially as described.

3. A moth and insect trap, comprising a suitable tank, an annular frame resting upon the same and provided with an annular trough depending within but above the water-line of the same, a cover superposed with relation to said frame, clamping-bolts connecting the outer corners of the cover and said frame, radial deflectors between said frame and cover and mounted upon said bolts, and a lantern secured to the inner ends of said deflectors and suspended above the water-line of the tank, substantially as described.

4. A moth and insect trap, comprising a suitable tank, an annular frame thereon and provided with a trough depending within but above the water-line of the tank, a cover above said frame, bolts connecting said cover and frame at their corners, a pair of alined deflectors or shields secured at their outer ends upon the correspondingly-located bolts, a lantern secured firmly between their inner ends and suspended above the water-line of the tank, and provided with apertured angle-plates, slide-rods extending down through the cover of said angle-plates, and a second pair of deflectors or shields mounted pivotally at their outer ends upon the correspondingly-located tie-bolts of said cover and frame, and resting at their inner ends upon said angle-plates, and loosely embracing said slide-rods, substantially as described.

5. A moth and insect trap, comprising a suitable tank, an annular frame mounted thereon and provided with a trough which depends within but is above the water-line of the trough, radial deflectors or shields upon said frame, a cover upon said deflectors or shields, and a lantern suspended by said deflectors or shields above the water-line of the tank, and provided with a feed-tube extending up through the cover and closed by a screw-cap, substantially as described.

In testimony whereof we have affixed our signatures in the presence of two witnesses.

EDWARD A. MURPHY.
JAMES D. WATERS.

Witnesses:
GEO. A. GAW,
W. J. YOUNG.